United States Patent [19]
Janssen et al.

[11] Patent Number: 4,626,943
[45] Date of Patent: Dec. 2, 1986

[54] TORSIONAL ACTUATOR FOR LOADING AND UNLOADING FLEXIBLE DISK DRIVE

[75] Inventors: Donovan M. Janssen; Alan J. Kirton, both of Boulder; Robert M. Murphy, Longmont; Leroy Rose, Boulder, all of Colo.

[73] Assignee: International Business Machines Corp., Armonk, N.Y.

[21] Appl. No.: 627,651

[22] Filed: Jul. 3, 1984

[51] Int. Cl.⁴ .................... G11B 5/016; G11B 17/02; G11B 21/12
[52] U.S. Cl. ................. 360/99; 360/130.34; 369/270
[58] Field of Search .............. 360/97, 99, 105, 130.34; 369/180, 270

[56] References Cited
U.S. PATENT DOCUMENTS

| | | | |
|---|---|---|---|
| 4,040,106 | 8/1977 | Medley | 360/99 |
| 4,040,107 | 8/1977 | Bryer | 360/99 |
| 4,125,883 | 11/1978 | Rolph | 360/99 |
| 4,193,102 | 3/1980 | Beuch et al. | 360/105 |
| 4,541,025 | 9/1985 | Sidhu et al. | 360/99 |

OTHER PUBLICATIONS

Pierson, "Energy-Dampening Device for Disk Drive Machine", IBM Tech Disc Bull, vol. 21, No. 12, May 1979, pp. 4965-4968.
"Centering and Clamping a Floppy Disk in a Diskette Drive", by J. J. Holecek et al, IBM Technical Disclosure Bulletin, 26:1, Jun., 1983, pp. 166-167.

Primary Examiner—Robert S. Tupper
Attorney, Agent, or Firm—Robert E. Harris

[57] ABSTRACT

A torsional actuator is disclosed for loading and unloading a flexible disk drive. The actuator includes a torsion beam having a biasing arm and a plurality of actuating arms extending therefrom with the free ends of the actuating arms being separately engageable with different ones of the collet, pressure pad and recording head arm of the flexible disk drive. The arms of the actuator are configured to enable selective and sequential movement of the collet, pressure pad and/or recording head arm in one direction toward a disk within the drive to establish a loaded, or operational, position and in the opposite direction away from a disk within the drive to establish an unloaded, or disk accessing, position with such positioning being determined by a force applying cam engageable with the actuator.

7 Claims, 9 Drawing Figures

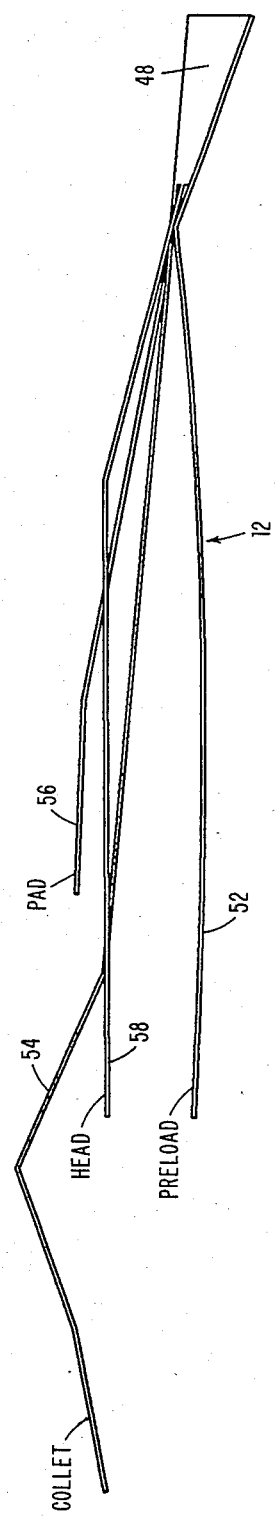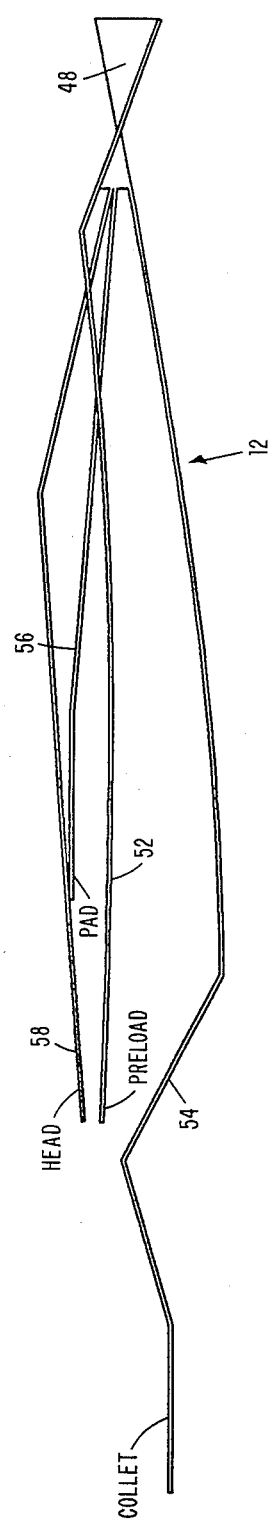

TORSIONAL ACTUATOR FOR LOADING AND UNLOADING FLEXIBLE DISK DRIVE

FIELD OF THE INVENTION

This invention relates to a flexible disk drive, and, more particularly, relates to loading and unloading of flexible disks in a flexible disk drive.

BACKGROUND OF THE INVENTION

Flexible disk drives, which are also known as floppy disk drives or diskette drives, have the capability of reading or writing magnetic signals on interchangeable flexible disks. The flexible disk is loosely contained in a flexible cartridge or envelope (as shown and described, for example, in U.S. Pat. No. 4,193,102).

The envelope, or cartridge, has a central aperture through which the central aperture of the disk is exposed, and there is also a head access slot through the envelope so that a recording head can interact with the surface of the disk. In addition, a cleaning liner is normally included within the envelope so that, upon application of pressure thereto, the cleaning liner engages the surface of a rotating disk.

When a disk is loaded in the disk drive, a collet clamps the disk to a spindle which is driven to rotate the disk within the disk envelope. Also, a recording head (or heads) is loaded against the surface of the disk through the access slot, and, a pressure pad is gently loaded against the envelope at a position adjacent the head access slot to cause the cleaning liner within the disk envelope to wipe the disk surface just prior to the surface moving past the recording head.

To unload and/or reload a flexible disk cartridge in the disk drive, requires the pressure pad, recording head and collet to be lifted in a direction away from the disk cartridge. The disk cartridge may then be pulled from the drive and another disk cartridge can be inserted, if desired. Actuators for lifting and then lowering the pressure pad, recording head and collet are well known. Examples of such actuators may be found in U.S. Pat. Nos. 4,040,106 and 4,193,102.

In the device shown in U.S. Pat. No. 4,040,106, a "wishbone" frame is utilized to carry a collet, a cleaning pressure pad and a head-pad lifting bail. The top of the wishbone frame is attached to a door at the disk cartridge insertion slot. When the door is pivoted up, the wishbone frame lifts the collet clear of the drive spindle, lifts the cleaning pressure pad from the disk envelope, and lifts the bail which raises the head pressure pad from the disk surface.

In the device shown in U.S. Pat. No. 4,193,102, solenoids and cams are utilized to actuate lifting arms. One arm is a flat spring that lifts and lowers the collet relative to the spindle in response to pressure from a cam rotated by a load lever. Another cam carries the cleaning pressure pad and the recording head lifting bail. This arm is released for operation by the load lever that is actuated by a solenoid. The cleaning pressure pad and recording head are loaded against the head by the solenoid only during read/write operations.

Disk operating devices are also shown, by way of example, in U.S. Pat. Nos. 4,040,107 and 4,125,883, as well as in an article by J. J. Holecek, G. E. Lightner and M. N. Zell, entitled "Centering and Clamping a Floppy Disk in a Diskette Drive", appearing in IBM Technical Disclosure Bulletin, Volume 26, Number 1, June, 1983, pages 166–167.

Thus, while disk drive devices are now known and/or utilized, further improvements thereto are still felt warranted, including improvements to reduce design and/or manufacturing expense requirements and/or to provide disk drive devices that lend themselves to automated manufacturing operations.

SUMMARY OF THE INVENTION

This invention provides an improved flexible disk drive having an improved actuator for loading and unloading of a flexible disk drive with the resulting device providing a simplified structure that is well suited for automated manufacturing operations. To accomplish the desired end, a torsional actuator in the form of a flat spring is utilized for enabling selective movement of the collet, recording head and pressure pad.

It is therefore an object of this invention to provide an improved flexible disk drive having a torsional actuator for loading and unloading the drive to thereby provide a simplified structure that is well suited for automated manufacturing operations.

With these and other objects in view, which will become apparent to one skilled in the art as the description proceeds, this invention resides in the novel construction, combination, and arrangement of parts substantially as hereinafter described and more particularly defined by the appended claims, it being understood that changes are meant to be included as come within the scope of the claims.

DESCRIPTION OF THE DRAWINGS

The accompanying drawings illustrate a complete embodiment of the invention according to the best mode so far devised for the practical application of the principles thereof, and in which:

FIG. 7 is a side view of the flat spring in the unloaded condition;

FIG. 9 is a side view of the flat spring in the loaded condition.

DESCRIPTION OF THE INVENTION

Figure 1:
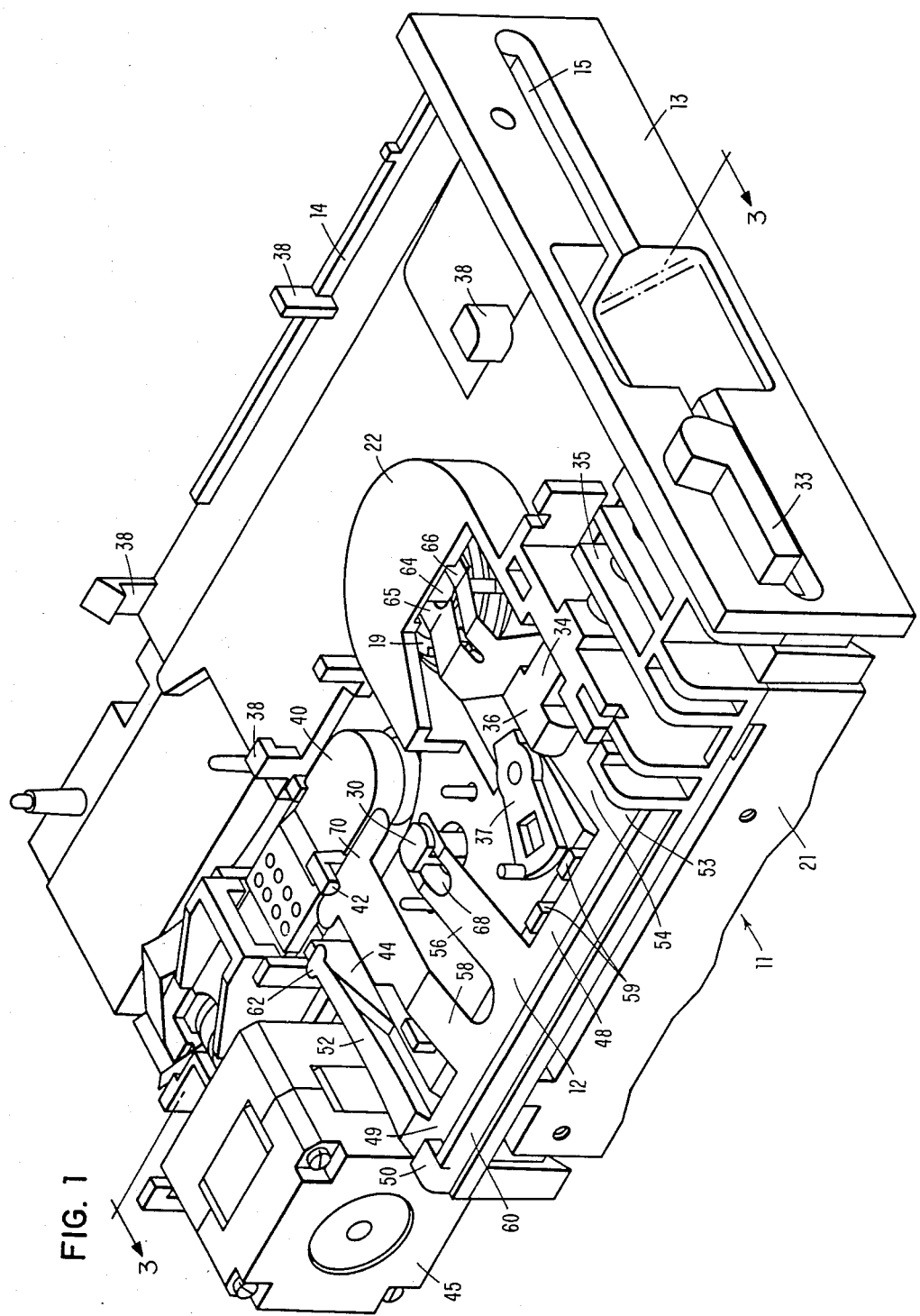
FIG. 1 is a perspective view of a flexible disk drive having the actuator of this invention included therein, with the disk drive being shown without a logic card at the top plate to better illustrate the invention.
Figure 2:
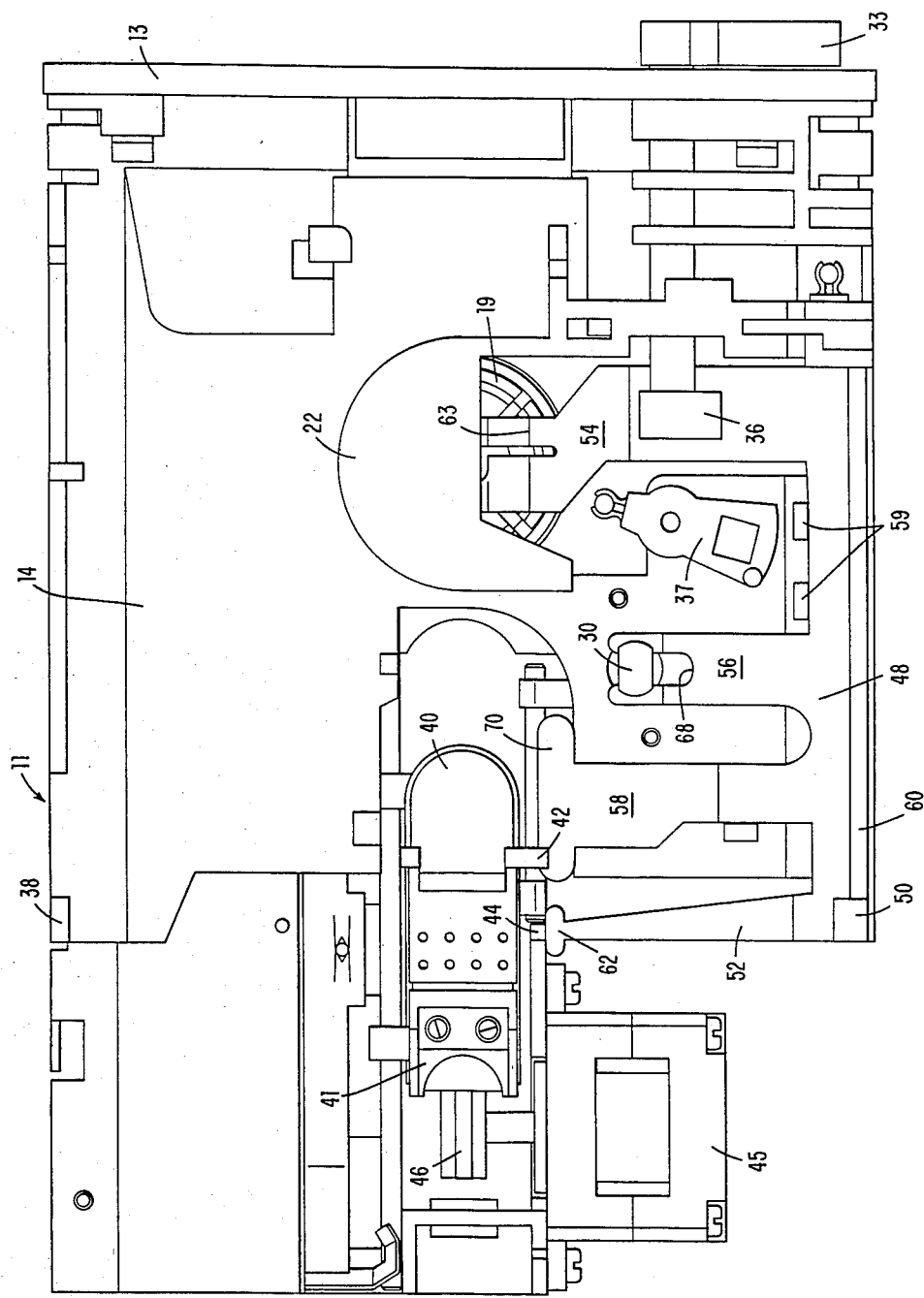
FIG. 2 is a top view of the flexible disk drive shown in FIG. 1.
Figure 3:
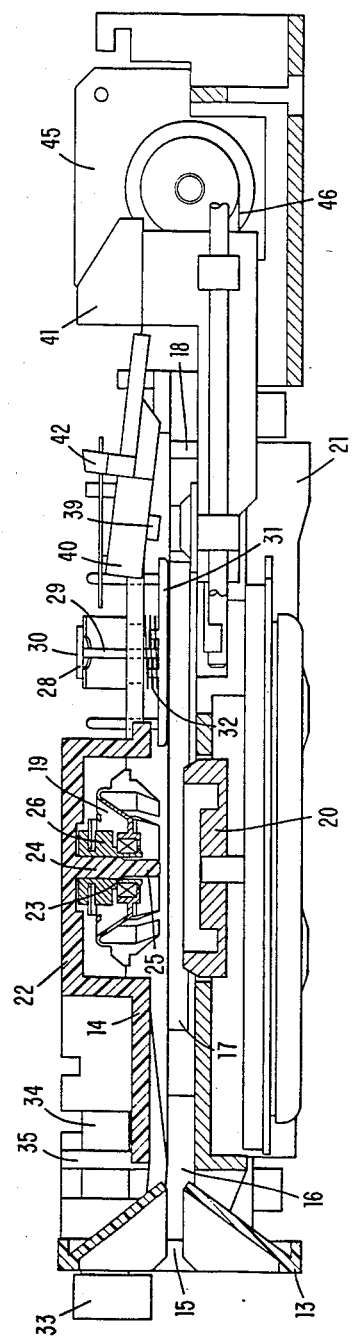
FIG. 3 is a side-sectional view taken through lines 3–3 of FIG. 1.

A flexible disk drive 11 is shown in FIGS. 1 through 3, and illustrates such a drive with the actuator 12 of this invention included therein. Flexible disk drive 11 is shown in FIGS. 1 through 3 without the logic card (a printed circuit board with electronic components thereon) that is positioned on the top of the drive and provides the electrical interfacing for the device.

While drive 11, as particularly shown herein, is a half-high, five and one-fourth inch diskette drive, as is typically used in a personal computer, it is to be realized that the invention described herein may also be utilized in any disk drive where the disk is registered to the spindle by being colleted through a central aperture in the disk enclamped to the spindle by the collet.

As shown, flexible disk drive 11 includes a front panel 13 connected with top plate 14, with the front panel having an access slot 15 therein through which the disk envelope, with the floppy disk therein, may be inserted into passage 16 of drive 11 below top plate 14. Passage 16 (see FIG. 3) within the drive must allow free movement of the disk envelope rearwardly and forwardly during insertion and removal, respectively, of the envelope into the drive, but must also coarsely position an inserted disk envelope, which positioning is carried out by guides 17 at the opposite sides of passage 16 and rear stops 18.

It is also necessary that the floppy disk within an envelope in the disk drive be precisely positioned for proper operation, and this is accomplished by collet 19, in conjunction with spindle 20 (see FIG. 3), during loading, as is brought out more fully hereinafter.

As shown in FIGS. 1 through 3, the critical elements for loading and unloading of the flexible disk drive are positioned, or mounted, on top plate, or upper frame member 14, while the critical elements for reading and writing on flexible disks loaded into the flexible disk drive are positioned, or mounted, on lower, or main, frame member 21.

Collet 19 is mounted under raised portion 22 of top plate 14 on downwardly extending collet shaft 23 (having a larger diameter inner, or upper, portion 24 and a smaller diameter outer, or lower, portion 25) by collet pin 26 so that collet 19 is received in spindle 20 through the central aperture of a flexible disk within passage 16 during each loading operation.

Pressure pad 28 is also mounted at top plate 14 and includes a pin 29 having a head 30 at the top that extends upwardly above the top panel when assembled, a foot 31 at the bottom that extends into passage 16, and a spring 32 between foot 31 and the bottom of top plate 14 to bias the pressure pad downwardly toward the surface of a disk within passage 16.

A cam actuating handle 33 is mounted at the front end of shaft 34 just forwardly of front panel 13. Shaft 34 is rotatably mounted in vertical ribs 35 of top plate 14 and extends through an aperture in front panel 13 to receive handle 33. A cam 36 is positioned at the rear end of shaft 34 so that rotation of handle 33 controls cam actuation. In addition, a mounting bracket 37 is mounted on top plate 14 rearwardly of cam 36, to position a photodiode utilized for indexing purposes, while logic card positioning and/or restraining ears 38 are also provided for positioning the logic card (not shown).

Recording head 39 (see FIG. 3) is mounted on recording head arm 40, and arm 40 is pivoted on head carriage 41. An upwardly and outwardly extending finger 42 is mounted on recording head arm 40, and main frame 21 has an upwardly extending shoulder 44 at one side of carriage 41. Carriage 41 is mounted on main frame 21 so as to be constrained to forward and rearward movement with respect to the main frame, with such movement being controlled by stepping motor 45 through band and tensioner assembly 46, with motor 45 being also mounted on main frame 21. Stepping motor 45, in connection with band and tensioner assembly 46, steps head carriage 41 along a radial line of a flexible disk within passage 16 to maintain the recording head (upper or lower) on head carriage 41 aligned with the desired track on the disk.

In this invention, lifting and lowering of the collet, recording head arm and pressure pad are enabled through use of a single flat spring structure 12 which is referred to herein as a torsional actuator. Flat spring 12 includes a torsion beam 48 that engages the upper side of top plate 14. One end 49 of torsion beam 48 is received under lip 50 of top plate 14 and has a preload biasing, or lifting, arm 52 extending therefrom, while the other end 53 of torsion beam 48 has a collet actuating, or lifting, arm 54 extending therefrom. A pressure pad actuating, or lifting, arm 56 and a recording head actuating, or lifting, arm 58 extend from the middle portion of the torsion beam with the middle portion being restrained against movement by ears 59 and side rail 60. The torsion beam and all of the lifting arms of the actuator are bendable beams which are preferably constructed of thin metal, such as stainless steel, to form a unitary flat spring.

The free end 62 of preload biasing arm 52 engages the top of shoulder 44 to provide a bias to the actuator when the device is in the assembled condition. Collet actuating arm 54 has a V-shaped portion 63 for adaption of the arm to the collet, and a notch 64, formed from legs 65 and 66, extends inwardly from the end of the arm so that collet pin 26 is received in the notch.

Figure 4:
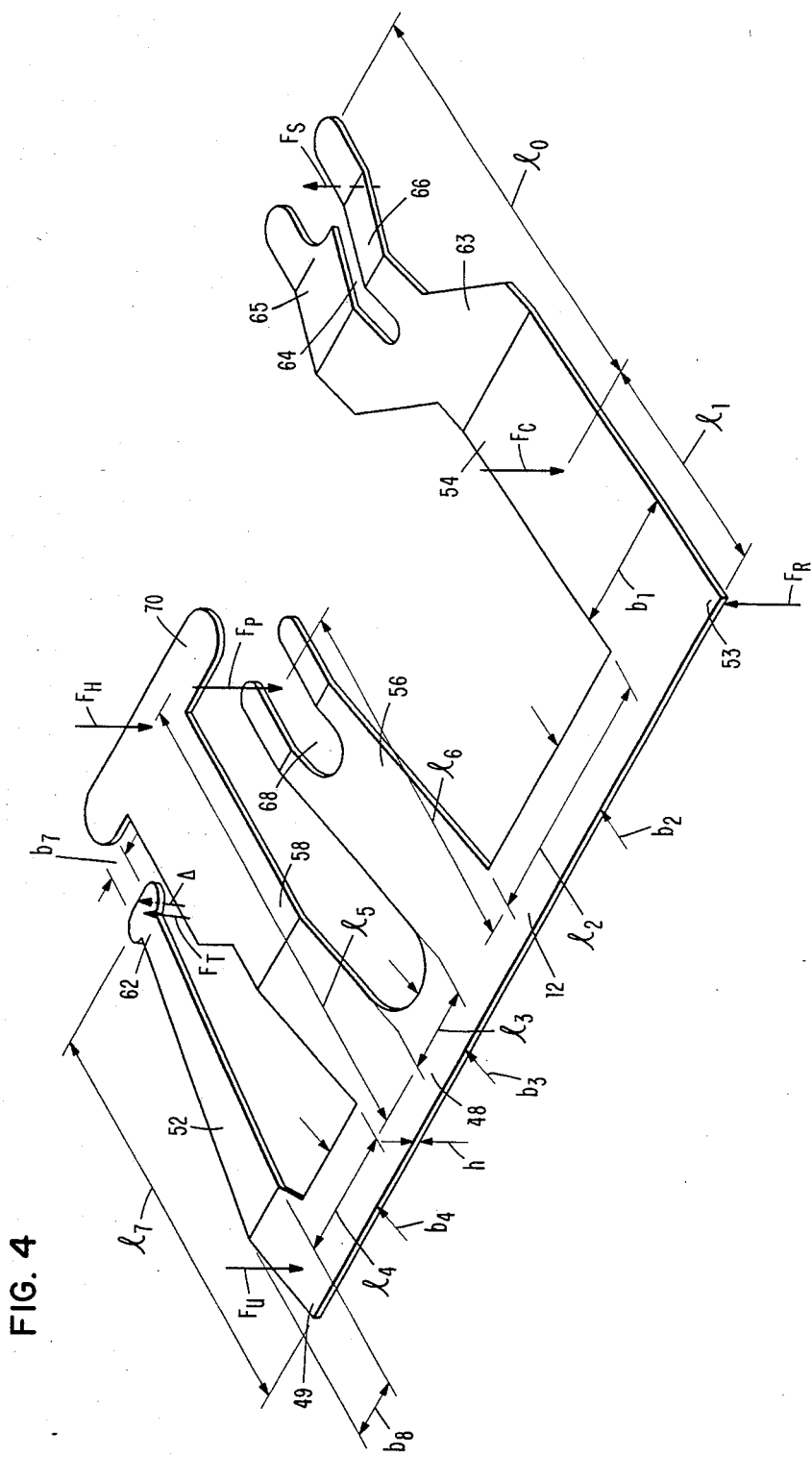
FIG. 4 is a perspective view of the a flat spring actuator utilized in this invention.

While a uniform notch 64 could be utilized, it has been found that media slip can be avoided, at least in some disk drives, by configuring notch 64 off-center, as shown best in FIG. 4. By use of an off-center notch, such as is shown in FIG. 4, the force balance is changed between legs 65 and 66 such that they exert equal force on the collet pin and thus avoid a force imbalance, which could cause the collet to precess relative to the spindle and thus cause media slip.

Pressure pad actuating arm 56 also has an inwardly directed notch 68 at the free end to receive pin 29 of pressure pad 28 therein. The free end of recording head actuating arm 58 has a T-shaped portion 70 thereat, which T-shaped portion is received below finger 42 of recording arm 40, which finger extends above the top of the recording head actuating arm.

The arms of actuator 12 are configured as needed to accomplish the desired end. Thus, preload bias arm 52 is deflected with respect to the other arms to provide a preload bias to the torsion beam, while the actuating arms are selectively bent to control the sequence of loading the collet, the cleaning liner (through the pressure pad), and the recording head (through the recording head arm) onto a disk within the disk drive, and the configuration of the collet actuating arm determines the load force exerted on the collet when loaded.

A perspective view of actuator 12 is shown in FIG. 4. With respect to FIG. 4, the loaded and unloaded input deflections are shown by the following equations:

Unloaded $$\Delta = \theta_u l_7 = (\theta_a + \theta_b + \theta_c + \theta_d + \theta_e) l_7 =$$

-continued $$\frac{l_7}{h^3}\left\{\frac{6l_7M_u}{Eb_7\left(\frac{b_8}{b_7}-1\right)^3}\left[\left(\frac{b_8}{b_7}-1\right)\left(\frac{b_8}{b_7}-3\right)+\right.\right.$$

$$\left.\left.2\ln\left(\frac{b_8}{b_7}\right)\right]+\frac{3l_4M_u}{Gb_4}+\frac{3(M_u-F_Hl_5)l_3}{Gb_3}+\right.$$

$$\left.\frac{3(M_u-F_Hl_5-F_pl_6)l_2}{Gb_2}+\frac{4(M_u-F_Hl_5-F_pl_6)l_1}{Eb_1}\right.$$

Loaded $\Delta = \theta_L l_7 \quad F_H = F_P = 0 =$ $$\frac{1}{h^3}\left\{\frac{6l_7M_L}{Eb_7\left(\frac{b_8}{b_7}-1\right)^3}\left[\left(\frac{b_8}{b_7}-1\right)\left(\frac{b_8}{b_7}-3\right)+\right.\right.$$

$$\left.\left.2\ln\left(\frac{b_8}{b_7}\right)\right]+\frac{3M_L}{G}\left(\frac{l_4}{b_4}+\frac{l_3}{b_3}+\frac{l_2}{b_2}\right)+\right.$$

$$\left.\frac{l_1M_L}{Eb_1}\left(4-\frac{l_1}{l_1+l_o}\right)\right\}-\frac{l_1+2l_o}{2l_1l_o}S_2-\frac{S_1}{l_1}$$

Figure 5:
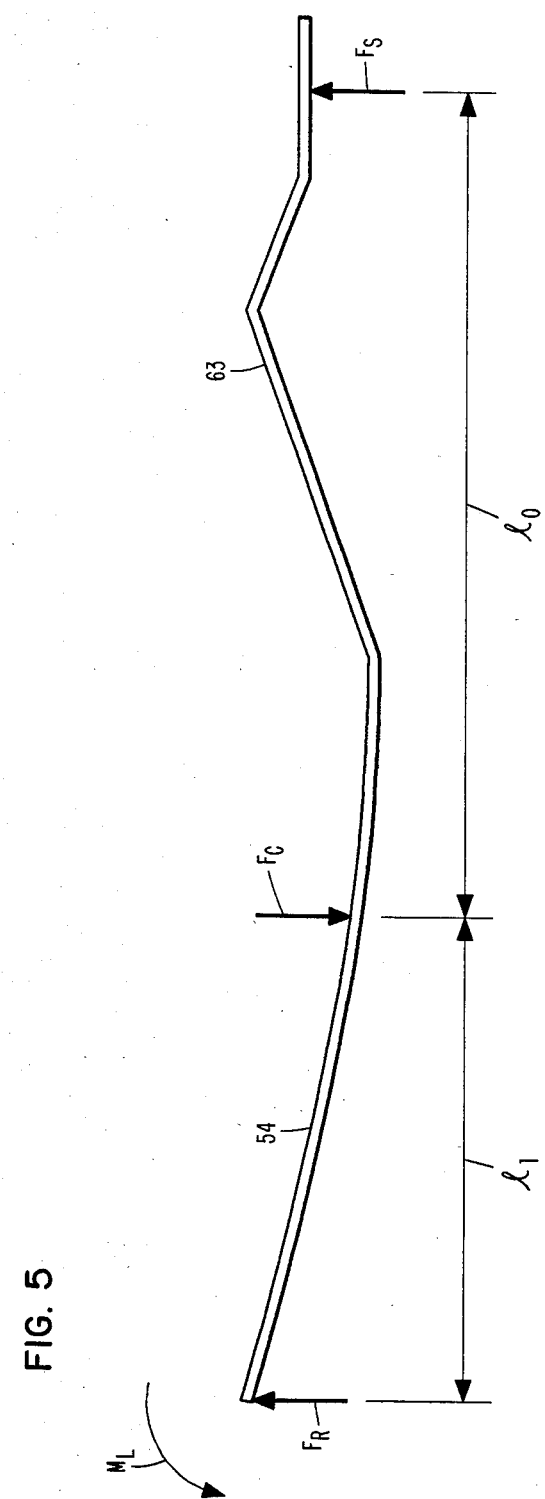
FIG. 5 is a partial side view of the collet actuating arm of the flat spring actuator shown in FIG. 4.

$\Delta$—Input Deflection
$\theta_u$—Total Angular Deflection when unloaded
$\theta_L$—Total Anuglar Defection when loaded
E—Modulus of Elasticity
G—Torsional Modulus of Elasticity
$M_u$—Unloaded moment seen in leg $b_4$ and equal to $F_Tl_7$
$M_L$—Loaded moment see in leg $b_4$
$S_1$—Deflection at $F_c$ to engage collet
$S_2$—Deflection at $F_c$ to load collet after engaged In addition, with the collet arm loaded, as shown in FIG. 5, the following relationships are established:

$$F_s = \frac{M_Ll_1}{2(l_o+l_1)l_o} + \frac{\delta_2Eb_1h^3}{4l_1l_o^2}$$

$$F_c = \frac{M_L}{2l_o} + \frac{\delta_2Eb_1h^3(l_1+l_o)}{4l_1^2l_o^2}$$

Figure 6:
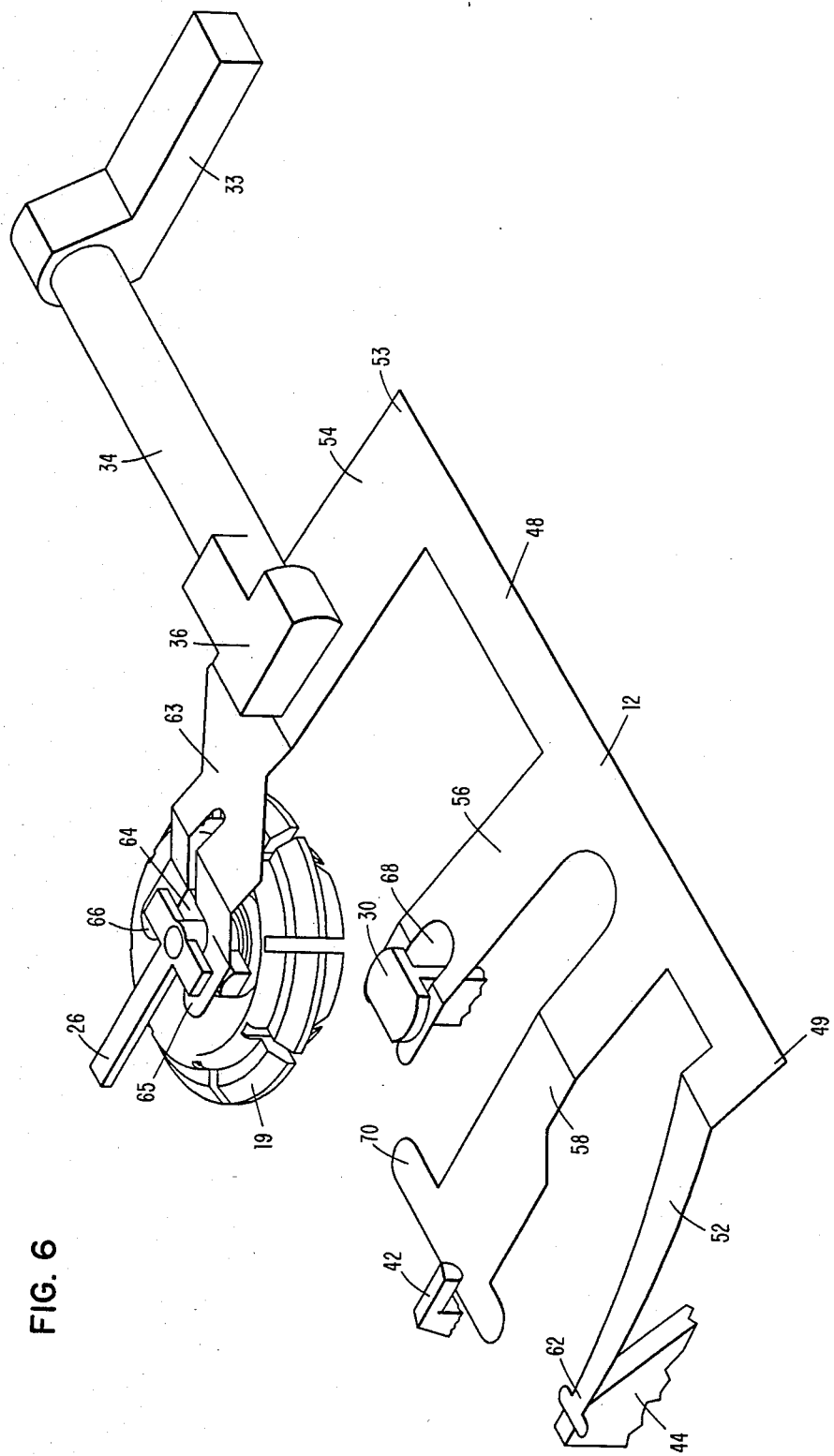
FIG. 6 is a partial perspective view illustrating the flat spring and cam mechanism in the unloaded condition.

FIG. 6 illustrates the unloaded, or disk access, position of the drive. As shown, cam 36 engages the top central portion of collet actuating arm 54 but exerts no downward deflection thereto (other than that needed to balance the upward force imposed by bias arm 52 of actuator 12 as brought out hereinafter). Preload biasing arm 52 exerts a predetermined torsion force to the actuator due to engagement of the free end of the arm with shoulder 44, and this force causes the actuator to be turned so that the free ends of the actuating arms are raised in a direction away from the collet, pressure pad, and recording head to thus engage the bottom portion of the cam, pressure pad head, and recording arm shoulder. The configuration of the actuator in the unloaded condition is shown by the side view of FIG. 7. In the unloaded condition, the collet, recording head and pressure pad are withdrawn from the disk and/or disk envelope to allow disk access to the passage within the drive which permits insertion and removal of disks as desired.

Figure 8:
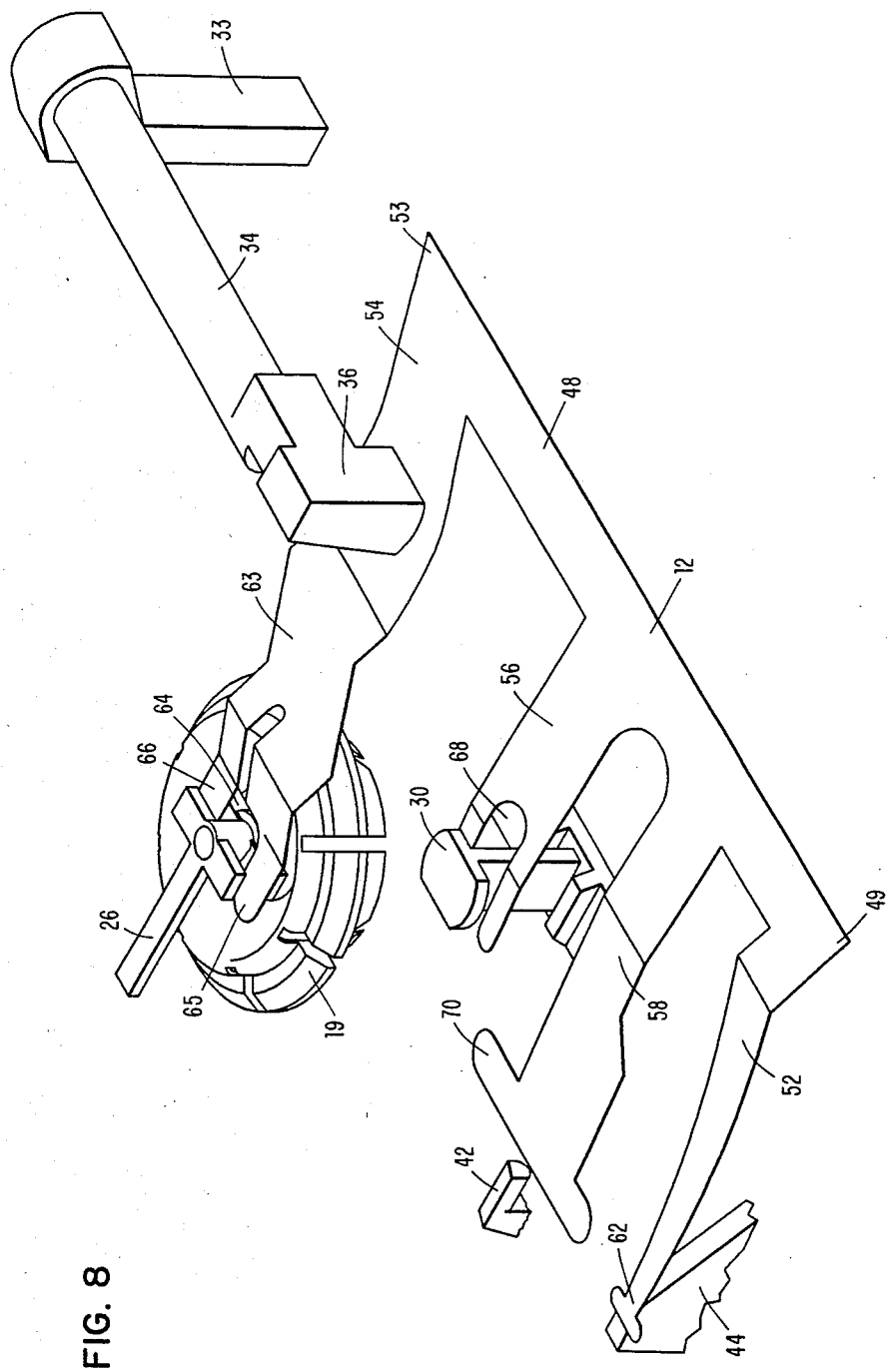
FIG. 8 is a partial perspective view illustrating the flat spring and cam mechanism in the loaded condition.

FIG. 8 illustrates the loaded, or operational, position of the drive. As shown, cam 36 has now been rotated by handle 33 (which handle now extends across a portion of the access slot 15) to depress collet actuating arm 54 and to apply a torsion force to the actuator which overcomes the bias imposed by biasing arm 52 to thereby depress pressure pad actuating arm 56 and recording head actuating arm 58. This causes collet 19 to be depressed to load the collet onto the spindle, and enables the pressure head pad and recording arm to be lowered to cause the cleaning liner and recording head to be in contact with the surface of the disk (either simultaneously or in either order, as determined by the utilized configuration of the arms of the tortional actuator). The configuration of the actuator in the loaded condition is shown by the side view of FIG. 9.

As can be appreciated from the foregoing, this invention provides an improved flexible disk drive having an improved actuator for loading and unloading a flexible disk drive by means of a single flat spring structure.

What is claimed is:

1. In a flexible disk drive having a frame, a drive spindle, and a collet to clamp a flexible disk to the drive spindle, apparatus for moving the collet toward and away from the spindle to thereby load and unload the disk drive, said apparatus comprising:
    a torsion beam;
    a preload arm attached to said torsion beam and engaging said frame to preload said torsion beam with a predetermined amount of torsion;
    an actuating arm attached to said torsion beam and engageable with said collet for causing movement of said collet toward and away from said spindle;
    a loading cam moveable between a load position and an unload position with said loading cam applying a force to said actuating arm when in said load position;
    said actuating arm moving said collet away from said spindle in response to said torsion force in said torsion beam due to said preload arm when said loading cam is in said unload position; and
    said actuating arm moving said collet onto said spindle with a predetermined load force in response to the load force from said loading cam when said loading cam is in said load position.

2. The apparatus of claim 1 wherein said apparatus includes a recording arm having a recording head thereon and a second actuating arm connected to said torsion beam and engageable with said recording arm for enabling said recording head to be moved away from said flexible disk in response to said torsion force in said torsion beam due to said preload arm when said loading cam is in said unload position and for enabling said recording head to be moved toward said flexible disk upon application of the load force from said loading cam when said loading cam is in said load position.

3. The apparatus of claim 2 wherein said apparatus includes a pressure pad and a third actuating arm connected to said torsion beam and engageable with said pressure pad for enabling said pressure pad to be moved away from said flexible disk in response to said torsion force in said torsion beam due to said preload arm when said loading cam is in said unload position, and for enabling said pressure pad to be moved toward said flexible disk upon application of the load force from said loading cam when said loading cam is in said load position.

4. The apparatus of claim 3 wherein said torsion beam, said preload arm, said first actuating arm, said second actuating arm and said third actuating arm are flexible and integrally formed from a single flat spring.

5. The apparatus of claim 4 wherein said preload arm and said first, second and third actuating arms extend in substantially the same direction from said torsion beam and are contoured as necessary to achieve selective loading of a flexible disk when said loading cam is moved from said unload position to said load position.

6. The apparatus of claim 5 wherein said first, second and third actuating arms are contoured so that said collet is caused to be clamped to said spindle prior to engagement of said recording head with the surface of said flexible disk.

7. In a flexible disk drive for receiving a flexible disk having a frame, a recording head arm with a recording head thereon engageable with the surface of the flexible disk, a pressure pad for applying pressure to a cleaning liner engageable with the surface of the flexible disk, a drive spindle, and a collet to clamp the flexible disk to the drive spindle; a flat spring for enabling movement of said collet, recording head and pressure pad in different directions toward and away from the spindle and flexible disk to thereby load and unload the disk drive, said flat spring comprising:

a torsion beam;

a preload arm attached to said torsion beam and engaging said frame to preload said torsion beam with a predetermined amount of torsion;

a first actuating arm attached to said torsion beam and engageable with said collet for causing movement of said collet in said different directions toward and away from said spindle;

a second actuating arm attached to said torsion beam and engageable with said recording head arms for enabling movement of said recording head in said different direction toward and away from the surface of said flexible disk;

a third actuating arm attached to said torsion beam and engageable with said pressure pad to enable movement of said pressure pad in said different directions toward and away from said flexible disk;

a cam moveable between a load position and an unload position with said cam applying a force to said actuating arms when in said load position;

said first actuating arm moving said collet away from said spindle in response to said torsion force in said torsion beam due to said preload arm when said cam is in said unload position;

said first actuating arm moving said collet onto said spindle with a predetermined load in response to said load force from said cam when said cam is in said load position;

said second actuating arm moving said recording head away from said disk in response to said torsion force in said torsion beam due to said preload arm when said cam is in said unload position;

said second actuating arm enabling movement of said recording head into contact with the surface of said flexible disk when said cam is in the load position;

said third actuating arm moving said pressure pad away from said disk in response to said torsion force in said torsion beam due to said preload arm when said cam is in said unload position; and said third actuating arm enabling movement of said cleaning liner pad into cleaning contact with the surface of said flexible disk under pressure from said pressure pad when said loading cam is in said loaded position.

* * * * *